(12) United States Patent
Rasmussen et al.

(10) Patent No.: US 9,047,338 B2
(45) Date of Patent: Jun. 2, 2015

(54) MANAGING DRILL-THROUGH TARGETS

(75) Inventors: Glenn D. Rasmussen, Nepean (CA); David Dewar, Manotick (CA); Katherine Wallace, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1591 days.

(21) Appl. No.: 12/336,900

(22) Filed: Dec. 17, 2008

(65) Prior Publication Data

US 2010/0153417 A1    Jun. 17, 2010

(51) Int. Cl.
*G06F 17/30*    (2006.01)

(52) U.S. Cl.
CPC .............................. *G06F 17/30389* (2013.01)

(58) Field of Classification Search
None
See application file for complete search history.

(56) References Cited

U.S. PATENT DOCUMENTS

| | | |
|---|---|---|
| 6,801,910 B1 | 10/2004 | Bedell et al. |
| 7,096,465 B1 | 8/2006 | Dardinski et al. |
| 7,139,766 B2 | 11/2006 | Thomson et al. |
| 7,243,106 B2 | 7/2007 | Vierich et al. |
| 7,426,520 B2 | 9/2008 | Gorelik et al. |
| 2004/0034615 A1 | 2/2004 | Thomson et al. |
| 2004/0139045 A1 | 7/2004 | Vierich et al. |
| 2004/0139102 A1 | 7/2004 | Vierich et al. |
| 2004/0215626 A1* | 10/2004 | Colossi et al. ............... 707/100 |
| 2005/0034064 A1 | 2/2005 | Meyers et al. |
| 2006/0053128 A1 | 3/2006 | Gestrelius et al. |
| 2006/0294098 A1 | 12/2006 | Thomson et al. |
| 2007/0233666 A1* | 10/2007 | Carlson et al. ................. 707/5 |
| 2007/0233680 A1 | 10/2007 | Carlson et al. |
| 2007/0299676 A1* | 12/2007 | Seeds et al. .................... 705/1 |
| 2008/0027971 A1 | 1/2008 | Statchuk |
| 2009/0006447 A1 | 1/2009 | Balmin et al. |
| 2009/0012983 A1 | 1/2009 | Senneville et al. |
| 2010/0153333 A1 | 6/2010 | Rasmussen et al. |
| 2011/0258237 A1 | 10/2011 | Thomas |
| 2011/0295860 A1 | 12/2011 | Dewar et al. |
| 2011/0320432 A1 | 12/2011 | Dewar et al. |

FOREIGN PATENT DOCUMENTS

| | | |
|---|---|---|
| CA | 2435861 A1 | 1/2004 |
| CA | 2643699 A1 | 10/2007 |
| EP | 1447757 A2 | 8/2004 |

OTHER PUBLICATIONS

Rasmussen, Glenn D. et al., "Method of and System for Managing Drill-Through Source Metadata", U.S. Appl. No. 12/336,929, filed Dec. 17, 2008.

(Continued)

*Primary Examiner* — Syling Yen
(74) *Attorney, Agent, or Firm* — Stephen R. Tkacs; Stephen J. Walder, Jr.; Ryan G. Lewis

(57) ABSTRACT

A target drill-through metadata manager has a target drill-through metadata handler and a target specification processor. The target drill-through metadata handler defines and manages target drill-through metadata in a metadata model for model constructs that are selected as drill-through target constructs. The target specification processor processes a target report definition using the target drill-through metadata to locate a data item that refers to a drill-through target construct or part of a drill-through target construct, and automatically adds one or more target filters associated with the drill-through target construct to a target report.

24 Claims, 6 Drawing Sheets

(56) References Cited

OTHER PUBLICATIONS

U.S. Appl. No. 12/336,929, filed Dec. 17, 2008.
U.S. Appl. No. 13/034,786, filed Feb. 25, 2011.
U.S. Appl. No. 13/036,685, filed Feb. 28, 2011.
Interview Summary dated Aug. 9, 2011 for U.S. Appl. No. 12/336,929; 3 pages.
Office Action mailed Oct. 25, 2011 for U.S. Appl. No. 12/336,929; 25 pages.
Response to Office Action filed Aug. 3, 2011, U.S. Appl. No. 12/336,929, 19 pages.
Office Action mailed May 6, 2011 for U.S. Appl. No. 12/336,929; 26 pages.
Reply Brief filed Jun. 19, 2013, U.S. Appl. No. 13/034,786, 26 pages.
Appeal Brief filed Aug. 14, 2012, U.S. Appl. No. 12/336,929, 45 pages.
Examiner's Answer mailed Sep. 6, 2012, U.S. Appl. No. 12/336,929, 38 pages.
Final Office Action dated Oct. 11, 2012 for U.S. Appl. No. 13/034,786; 28 pages.
Notice of Allowance mailed Oct. 12, 2012 for U.S. Appl. No. 13/036,685; 7 pages.
Office Action mailed Aug. 24, 2012 for U.S. Appl. No. 13/036,685; 15 pages.
Reply Brief filed Nov. 5, 2012, U.S. Appl. No. 12/336,929, 27 pages.
Response to Office Action filed Sep. 17, 2012, U.S. Appl. No. 13/036,685, 9 pages.
U.S. Appl. No. 13/618,538.
Advisory Action dated Dec. 27, 2012 for U.S. Appl. No. 13/034,786; 4 pages.
Appeal Brief filed Feb. 7, 2013, U.S. Appl. No. 13/034,786, 24 pages.
Office Action mailed Dec. 6, 2012 for U.S. Appl. No. 13/618,538; 11 pages.
Response to Final Office Action filed Dec. 7, 2012, U.S. Appl. No. 13/034,786, 9 pages.
Response to Office Action filed with the USPTO on Mar. 1, 2013 for U.S. Appl. No. 13/618,538; 10 pages.
Examiner's Answer dated Apr. 25, 2013 for U.S. Appl. No. 13/034,786; 22 pages.
Interview Summary mailed Mar. 1, 2013 for U.S. Appl. No. 13/618,538; 3 pages.
Notice of Allowance mailed Mar. 14, 2013 for U.S. Appl. No. 13/618,538; 8 pages.
Interview Summary mailed Aug. 6, 2012, U.S. Appl. No. 13/034,786, 3 pages.
Office Action mailed May 7, 2012 for U.S. Appl. No. 13/034,786; 29 pages.
Response to Office Action filed Aug. 6, 2012, U.S. Appl. No. 13/034,786, 21 pages.
Final Office Action mailed Apr. 3, 2012 for U.S. Appl. No. 12/336,929; 31 pages.
Response to Office Action filed Jan. 13, 2012, U.S. Appl. No. 12/336,929, 28 pages.

* cited by examiner

MANAGING DRILL-THROUGH TARGETS

FIELD OF THE INVENTION

The present invention relates to a method of and system for managing drill-through target metadata.

BACKGROUND OF THE INVENTION

There exist reporting tools that generate reports of filtered data from underlying data sources. These tools often allow users to navigate from a source report to a target report, using values selected in the source report to filter data in the target report. This type of navigation is commonly known as "drill-through". By drilling through, users can explore or browse items in the reports. For example, when two reports are in a master/detail relationship, by clicking an item in the master report, the user can reach the details of the clicked item in the detail report. The component from which drill-through is initiated is referred as the drill-through source and the component in which drill-through is terminated is referred as the drill-through target. This relationship between a drill-through source and target is known as a drill-through path. A component may act as both drill-through source and target, such as in a parts explosion, in one drill through path. A component may be a drill-through source in one drill-through path, and a target in another drill-through path. A component may participate in an arbitrary number of drill-through paths.

In order to provide drill-through capabilities in their application, a report designer or author needs to predefine the drill-through paths between the reports that form the application. Generally speaking, a drill-through path identifies a single target object (such as a report) and may also provide parameter mappings which allow the target to filter its data based on data values provided by the source. It may also provide a scope qualifier that controls when the drill-through path may be used. A drill-through path need not specify a source, since it is implicit, i.e., for authored drill through, the source is the report that contains the drill-through path, and for modeled drill through, the source is any object based on the package that contains the drill-through path.

Authors of drill-through target reports need to define parameterized filters to accomplish drill-through.

There exists a report management system that can automatically construct filter expression strings that are passed to a drill-through target based on the parameter values specified on the drill-through request. The drill-through target then attempts to parse the expression strings, matching names to known metadata objects. If a name cannot be found, the expression (or part thereof) is not used in the drill-through target to filter the data set. Such a system uses a heuristic to determine how parameter values are matched to model items in report filters. This heuristic based approach offers a simple authoring experience at the cost of a trial and error runtime experience. Because of this laissez-faire approach, there is no need to define parameters in such a report. The advantage of this approach is the elimination of any upfront authoring costs and complexity and runtime binding of drill-through parameters to the target. The disadvantage is that the drill-through experience can change if either the source or target is changed, either as a result of adding/removing items or renaming existing items in either source or target.

A different existing system provides a predictable runtime experience but requires extensive authoring. Report authors need to be conscious of the implications of drill-through when authoring reports. In particular, authors need to define a significant set of parameterized filters in each report to satisfy the wide variety of drill-through parameter value combinations required by all the drill through paths with the report as the target. Defining too many parameters can make a report too difficult to use in stand-alone scenarios. Although these filters can be declared optional, users are still often forced to navigate through a significant set of prompts before the drill-through target report is executed. Authors are forced to trade-off drill-through flexibility for a simpler stand-alone experience. In the worst case, authors need to create multiple reports for the same data set: e.g., one with many parameterized filters to support a rich drill-through experience, and a second with a small subset of these filters to support the stand-alone experience.

It is therefore desirable to provide a mechanism to manage drill-through targets that reduces manual authoring of target filters and distributed specification of target filters, and provides improved performance when reports are heavily parameterized.

SUMMARY OF THE INVENTION

It is an object of the invention to provide an improved drill-through management system that obviates or mitigates at least one of the disadvantages of existing systems.

The invention defines additional properties for query items in a metadata model. These properties are used to augment a component when the component is invoked as a result of a user navigating a drill-through path with the component as the drill-through target. In an embodiment, the target component can be augmented by adding parameterized target filters defined in the metadata model to the component during its execution.

In accordance with an aspect of the present invention, there is provided a target drill-through metadata manager comprising a target drill-through metadata handler and a target specification processor. The target drill-through metadata handler is provided for defining and managing target drill-through metadata in a metadata model for one or more model constructs that are drill-through target constructs. The target specification processor is provided for processing a target report definition using the target drill-through metadata to locate a data item that refers to a drill-through target construct or part of a drill-through target construct, and automatically adding one or more target filters associated with the target drill-through construct to a target report.

In accordance with another aspect of the invention, there is provided a report system comprising a target drill-through metadata handler, a target specification processor and a metadata service. The target drill-through metadata handler is provided for defining and managing target drill-through metadata in a metadata model for one or more model constructs that are drill-through target constructs. The target specification processor is provided for processing a target report definition using the target drill-through metadata to locate a data item that refers to a drill-through target construct or part of a drill-through target construct, and automatically adding one or more target filters associated with the target drill-through construct to a target report. The metadata service is provided for providing the one or more target filters to the target specification processor based on the target drill-through metadata.

In accordance with another aspect of the invention, there is provided a method of managing drill-through targets. The method comprises the steps of defining, in a metadata model, target drill-through metadata for one or more model constructs that are selected as drill-through target constructs; processing a target report definition using the target drillthrough metadata to locate a data item that refers to a drill-through construct or part of a drill-through target construct; and automatically adding one or more target filters associated with the target drill-through construct to a target report.

In accordance with another aspect of the invention, there is provided a computer readable medium storing instructions or statements for use in the execution in a computer of a method of managing drill-through targets. The method comprises the steps of defining, in a metadata model, target drill-through metadata for one or more model constructs that are selected as drill-through target constructs; processing a target report definition using the target drill-through metadata to locate a data item that refers to a drill-through target construct or part of a drill-through target construct; and automatically adding one or more target filters associated with the target drill-through construct to a target report.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
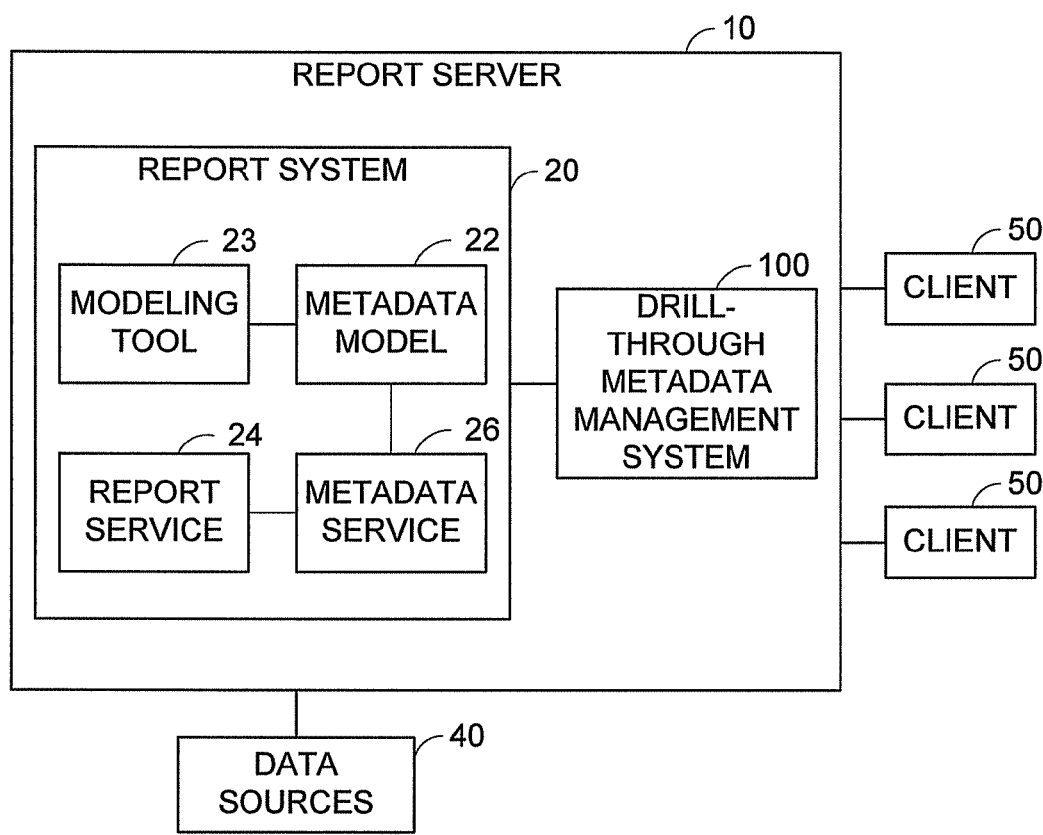
FIG. 1 is a block diagram showing a drill-through metadata management system in accordance with an embodiment of the present invention.

FIG. 1 shows a drill-through management system 100 in accordance with an embodiment of the present invention. The drill-through management system 100 can be suitably used with a report system 20 that generates reports of data in one or more underlying data sources 40.

The report system 20 has a metadata model 22, a modeling tool 23, a report service 24 having a query engine, and a metadata service 26. The metadata model 22 stores metadata describing the structure and business rules of the underlying data sources 40. The modeling tool 23 allows a modeler to manage the metadata model 22. The report service 24 accesses the metadata model 22 using the metadata service 26 to process report definitions containing queries to access data in the underlying data sources 40. The metadata service 26 provides services related to the metadata in the metadata model 22.

The report system 20 and the drill-through management system 100 are typically provided in a report server 10 and users access them through client computer systems 50. In this embodiment, the drill-through management system 100 is provided as a separate component from the report system 20. In a different embodiment, the drill-through management system 100 may be incorporated in a report tool.

Figure 2:
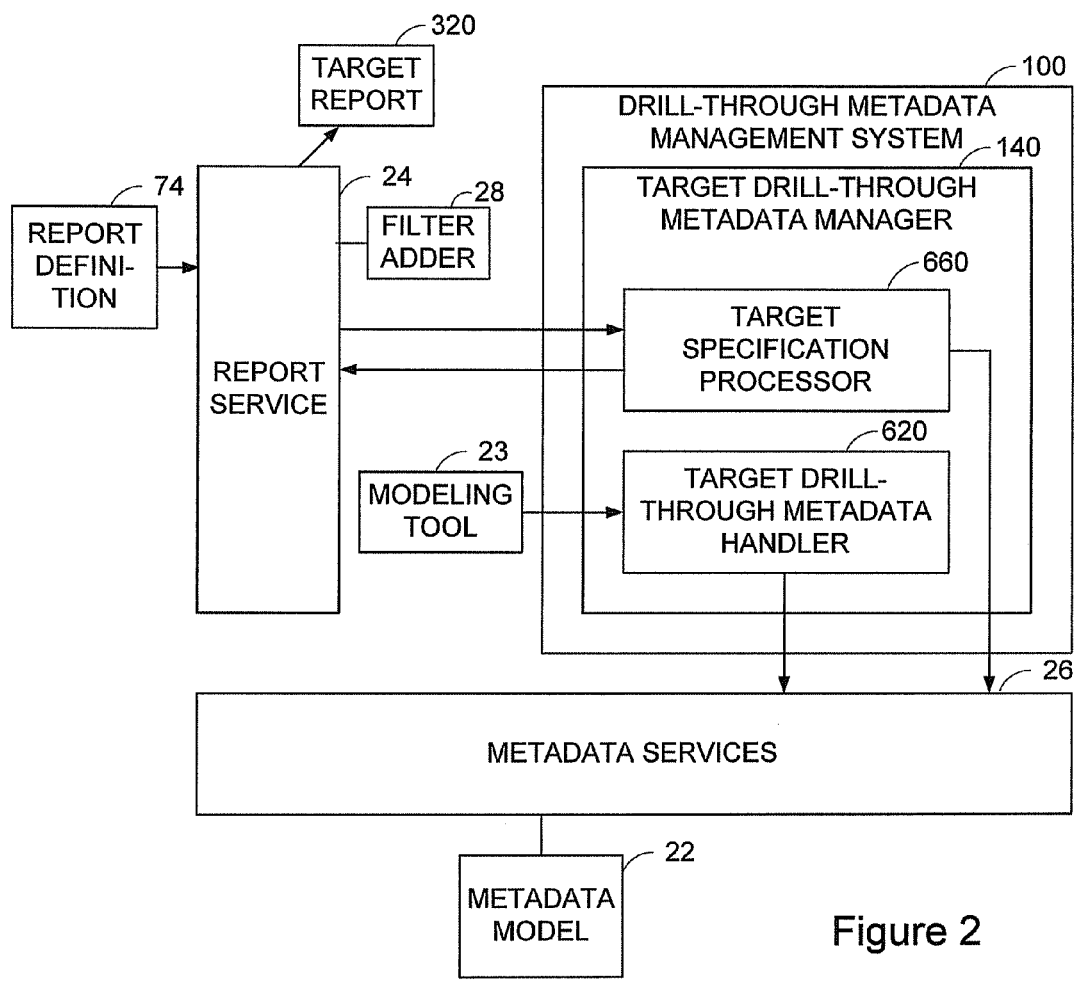
FIG. 2 is a block diagram showing an embodiment of the target drill-through metadata manager.

As shown in FIG. 2, the drill-through metadata management system 100 has a target drill-through metadata manager 140. The target drill-through metadata manager 140 manages target drill-through metadata for query items and the addition of parameterized target filters to reports at runtime based on the target drill-through metadata to provide the report consumer with additional drill-through opportunities by making more report parameters available. The target drill-through metadata manager 140 works with the report service 24, modeling tool 23 and the metadata service 26 of the report system 20 (FIG. 1). The target drill-through metadata manager 140 manages metadata and parameters of drill-through targets and addition of target filters to drill-through targets at runtime.

Figure 3:
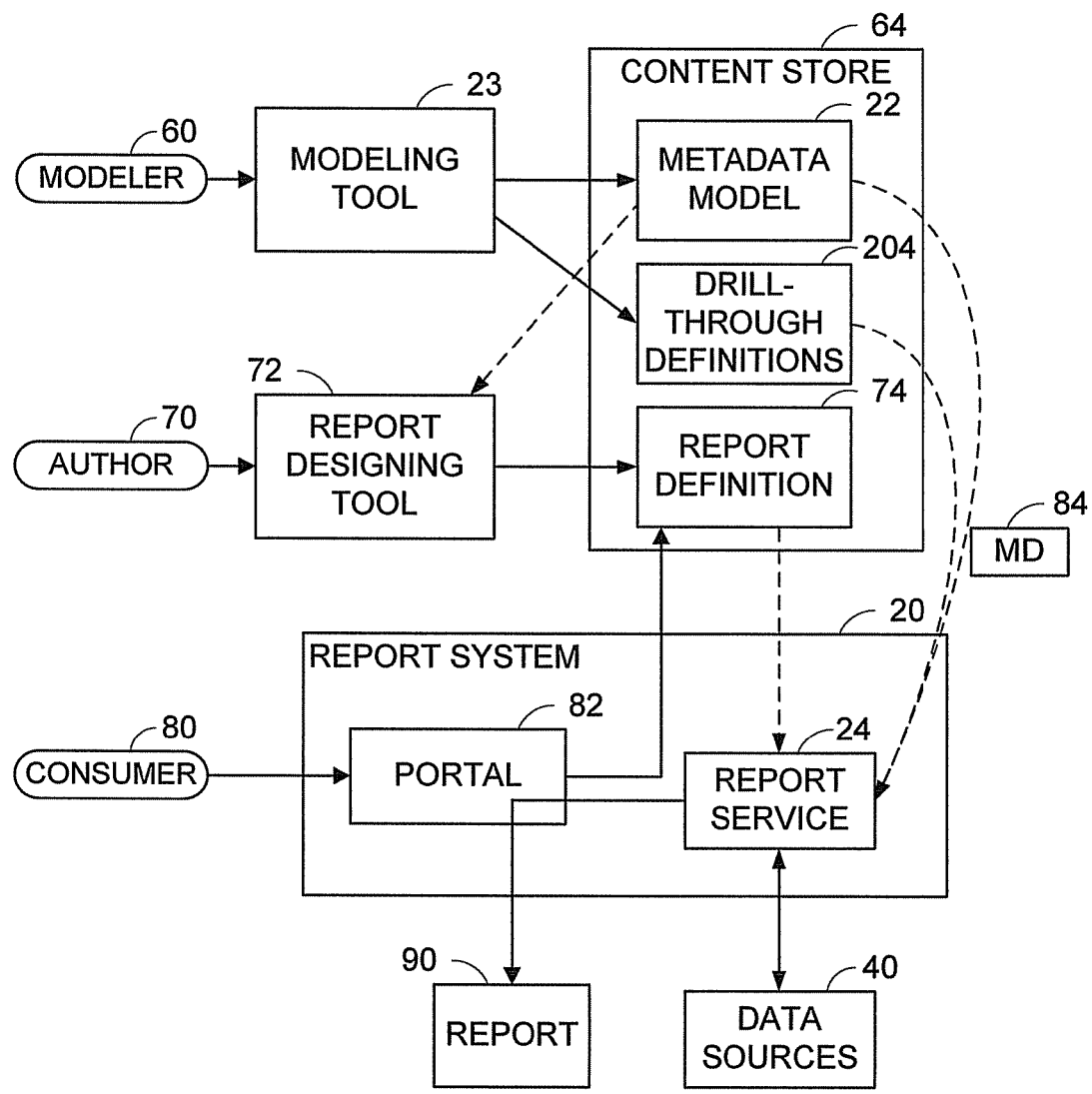
FIG. 3 is a diagram showing an example of processes of creation of a report definition and generation of a report.

Prior to describing the target drill-through metadata manager 140 in detail, referring to FIG. 3, an example of general processes of metadata model creation, report designing and report execution is described. For the data sources 40, a modeler 60 creates a metadata model 22 using a modeling tool 23, and publishes the metadata model 22 into a content store 64. The modeler 60 also authors drill-through definitions, or drill-through paths 204, and publishes them into the content store 64. When a report author 70 designs a report definition 74 using a report designing tool 72, the report designing tool 72 reads and uses relevant metadata from the metadata model 22 in the content store 64. The designed report definition 74 is a specification that contains queries for obtaining desired data from the underlying data source 40 and layout information of the data in an output report. The designed report definition 74 is normally stored in the content store 64, but it may be stored in a separate store. When a consumer 80 wants to generate a report 90 based on the report definition 74, the consumer 80 runs or executes the report definition 74 through a portal 82 of the report system 20. This causes the report service 24 of the report system 20 to read the report definition 74, and relevant metadata 84 from the metadata model 22 stored in the content store 64. The report service 24 processes the queries in the report definition 74 and accesses the data sources 40 to obtain the desired data. Thus, the report system 20 generates the report 90 with the data through the portal 82.

Figure 4:
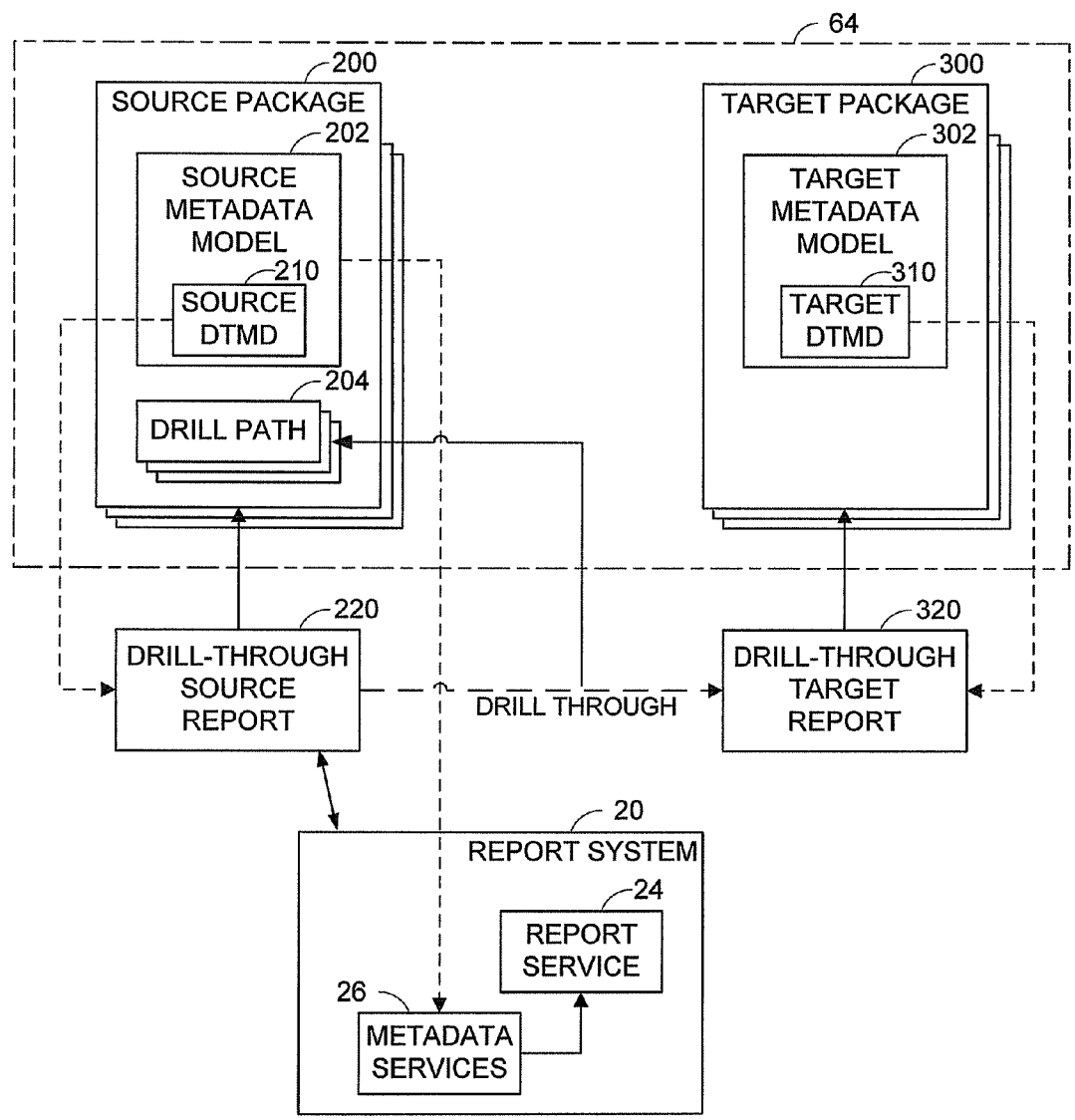
FIG. 4 is a diagram showing an example of the operation of the drill-through management system.

FIG. 4 schematically illustrates an example of the operation of the drill-through metadata management system 100. FIG. 4 is described using the example shown in FIG. 3. When the modeler 60 creates the metadata model 22 (FIG. 3), the modeler 60 also creates source packages 200 and target packages 300 in the content store 64. For example, a source package is created for a selected application domain, e.g., "sales", "inventory", and so on. A package may act as both a source package 200 and a target package 300. A package 200, 300 contains a metadata model 202, 302 that provides metadata representing the relevant application domain. The metadata model 202, 303 may also contain additional metadata 210, 310 that describes how query items can be used when they are used in the context of a drill-through operation. A source package 200 may contain drill-through definitions, or drill paths 204. Drill paths 204 use the query items defined in the metadata model 202, as described below. The target package 300 is another package that, for purposes of explanation, contains reports 320 that are targets for reports 220 in the package 200 acting as a drill-through source.

The functions of the target drill-through metadata manager 140 are now further described, referring to FIGS. 2-4. The target drill-through metadata manager 140 allows the modeler to define target drill-through metadata 310, i.e., to mark a model construct as a drill-through target construct in the target metadata model 302. A model construct represents any model element that can be marked as a drill-through target construct. When a report author 70 designs a report definition 74, the report author 70 does not need to know which model constructs are marked as a drill-through target construct. The modeler 60 may mark a query subject, query item, dimension, hierarchy or level in the metadata model as a drill-through target construct. When the consumer 80 runs a report definition 74, the target drill-through metadata manager 140 checks the target drill-through metadata 310 to see if the report definition 74 contains one or more data items that use model constructs that are marked as a drill-through target construct or use a part of a model construct marked as a drill-through target construct. If the report definition 74 contains one or more of these data items, the target drill-through metadata manager 140 automatically adds additional data filters to the target report 320.

The additional data filters that are added to the target report 320 are parameterized filters that are used with drill-through operations. These drill-through target filters are associated with a model construct and typically filter instances of the construct using a business key, however, other types of filtering are allowed. A target drill-through filter associated with a query item will typically filter instances of the containing model construct using the query item value.

There are two cases by which a target filter is added to a target report. In the first case, the modeler simply indicates in the target drill-through metadata 310 that the model construct can be used in the target context, and the target drill-through metadata manager 140 constructs the target filter to be added to the target report 320 at runtime. The second case occurs when the modeler needs or wants to provide a custom target filter, and constructs a filter definition in the target drill-through metadata 310. Defining custom target filters in the target drill-through metadata 310 removes the authoring burden from report authors. In any event, the target filter is added to the target report 320 at runtime in the same way using the target drill-through metadata 310, as further described below.

As shown in FIG. 2, an embodiment of the target drill-through metadata manager 140 has a target drill-through metadata handler 620 and a target specification processor 660.

The target drill-through metadata handler 620 allows the modeler 60 to define and manage target drill-through metadata for model constructs that are selected as drill-through target constructs The target drill-through metadata handler 620 allows the modeler 60 to select a model construct, and mark it as a drill-through target construct. The marking may use a drill-through property of the model construct, e.g., a Boolean property or a flag to indicate that it is a drill-through target construct.

Figure 5:
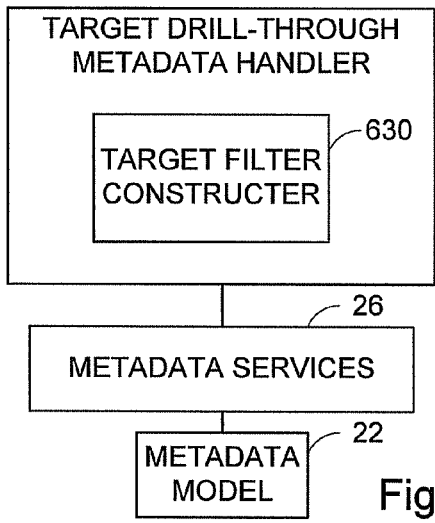
FIG. 5 is a block diagram showing an embodiment of a target drill-through metadata handler.

As shown in FIG. 5, the target drill-through metadata handler 620 may have a target filter constructer 630. The target filter constructer 630 allows the modeler to construct one or more custom drill-through target filters for a selected model construct. The target filter constructer 630 stores the constructed custom target filters in the drill-through metadata 310 in association with the selected model construct. In the embodiment shown in FIG. 5, the modeler uses the target filter constructer 630 to construct custom target filters. In a different embodiment, the modeler may use an existing filter defining facility in an existing metadata authoring tool to construct a filter that can be stored in the drill-through metadata 31 as a custom drill-through target filter. The filter stored as a custom drill-through target filter in the drill-through metadata 31 can be applied to a report by the target specification processor 660 when the report is run when a drill-through action triggers the execution of the report.

Thus, the drill-through metadata 310 includes, for each model construct selected as a drill-through target construct, an indication as a drill-through target construct and zero or more custom target filters.

The target specification processor 660 receives the report definition 74 from the report service 24 when the report definition 74 is run, and analyzes the report definition 74, using the metadata to determine if there are any data items used in the report definition 74 that use model constructs (or parts of model constructs) that are marked as drill-through target constructs. When such data items are located, the target source specification processor 660 extracts the target drill-through metadata 310 from the target metadata model 302 to construct the necessary queries. The target specification processor 660 obtains from metadata service 26 additional parameterized target filters that can be used when the target report is used as a drill-through target. For each located model construct, the metadata service 26 checks the target drill-through metadata 310 to see if there is any custom target filter stored for the drill-through target construct. If it finds one or more custom target filters, the metadata service 26 automatically extracts the custom drill-through filters, and provides them to the target specification processor 660. If the metadata service 26 does not find any stored custom target filters for the drill-through target construct, the metadata service 26 automatically generates one or more default target filters, and passes the default target filters to the target specification processor 660.

The target specification processor 660 receives from the metadata service 26 the default target filters generated by the metadata service 26 and/or custom target filters extracted from the target drill-through metadata 310. The metadata service does not distinguish whether a filter is a generated filter of a custom target filter. The target specification processor 660 does not require this information to process the filters. The target specification processor 660 has the received target filters added to a target report 320 by the report service 24 when a drill-through is being performed. The report service 24 has a filter adder 28 to incorporate these target filters into the processing logic of the metadata and report engine components 22, 24 of the report system 20. The filter adder 28 may also include target filters for query items added to the queries to construct the query plans. Once these target filters are included into the processing stream, no other drill-through specific activities are needed to generate a desired target report 320 with these filters added to the drill-through targets. Thus, the resultant target report 320 contains the target filters required to support drill-through. The filter adder 28 may add the target filters to the target report in a similar manner to the incorporation of security filters in a report.

The runtime generation of default target filters is carried out by the metadata service 26. This can eliminate the need to author "normal" filter expressions for drill-through. The modeler can simply select which model constructs are to be used to generate the filters. Report authors are saved the burden of authoring filters to support drill-through. Since the default target filters are generated at run time, they are generated in a manner that is consistent with the metadata.

In order to provide a good match, the metadata service 26 uses business keys in the target filter. For a relational database table with a single key, the metadata service 26 generates a target filter like "itemName in ?Parameter?". The metadata service 26 names the parameter in a predictable way, e.g., using the query subject name and the query item name in the name, and combines them in a predictable way. For example, the metadata service 26 may use: 'dt:' (A prefix to identify drillthrough filters)+QuerySubjectName+'_'+QueryItemName. For a Country query subject with a Code key query item, the default target filter handler 686 names the parameter 'dt:Country_Code', and the filter is "Country.Code in ?dt:Country_Code?". The metadata service 26 may generate a target filter for each key query item in the subject.

There are some special cases. For example, dates are normally considered ranges, so the metadata service 26 may generate a filter like Orders.OrderDate in_range ?dt:Orders_OrderDate?. For multidimensional models, the subject is replaced by a Dimension, Hierarchy or Level, and the metadata service 26 generates the filter usually based on the Member Unique Name (MUN). Thus, the metadata service 26 generates, e.g., Geography in ?dt:Geography?.

The other example is compound keys that represent a hierarchy. In this case, the metadata service 26 generates a filter: States.CountryCode in ?dt:country_code? And States.StateCode in ?dt:states_statesCode?

Figure 5A:
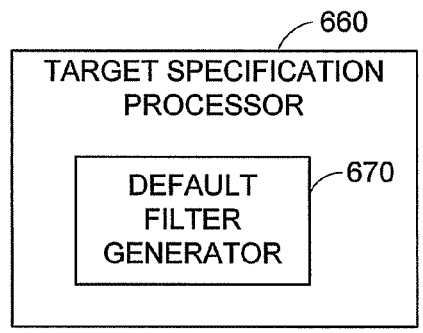
FIG. 5A is a block diagram showing an embodiment of a target specification processor.

In the embodiment described above, the runtime generation of default target filters is carried out by the metadata service 26. In a different embodiment, as shown in FIG. 5A, the target specification processor 660 may have a default target filter generator 670 that carries out the runtime generation of default target filters.

It is desirable that target filters are used when performing drill-through related activities. The target specification processor 660 receives from the report service 24 a run option for drill-through operations, which indicates whether or not a drill-through activity is underway. The target specification processor 660 is activated when the run option indicates that the drill-through activity is underway. By having the target specification processor 660 activated only when the drill-through activity is underway, the performance characteristics of running a report standalone are not affected significantly, and the user experience is better since the user is not presented with an abundance of unnecessary prompts. Allowing the consumer to specify whether the request to the report server is made in the context of a drill-through operation eliminates the need for report authors to trade-off drill-through flexibility for stand-alone behaviour. Ultimately, this functionality eliminates the worst case requirement to author multiple reports that differ only in the degree of parameterization.

When a request that is sent to the report server during a drill-through operation specifies the drill-through run option, the request can leverage the target filters managed in the model by the target drill-through metadata manager 140. In particular, the drill-through run option is used at authoring time to get the metadata for the parameters created by the drill-through target filters. The presumably larger set of parameters can then be used to establish mappings. This metadata can then be used to create parameter assignments which define how source context values are mapped to target parameters to support an effective drill-through experience. Parameter mappings are used to assign data item values from the source domain to parameters in the target domain.

Figure 6:
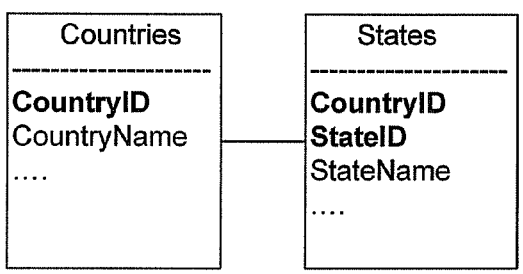
FIG. 6 is a diagram showing an example of a metadata model.

Examples of parameterized target filters are now described. An example is in the case of a relational model having two query subjects, Countries and States, as shown in FIG. 6. The modeler sets the target drill-through metadata 310 to indicate that these query subjects are drill-through targets. When a target report including a query item of either of these query subjects is executed, the target specification processor 660 locates the query item as indicated as a drill-through target, and creates a target filter or finds the custom target filters. For the Countries query subject, the target specification processor 660 creates the following target filter:

[Country].[CountryID] in ?dt:Country_CountryID?

For the States query subject, there are several scenarios. If the StateID query item values are unique, the runtime filter creation handler 686 may create the following filter:

[States].[StateID] in ?dt:States_StateID?

If StateID values are unique only in combination with CountryID, the target specification processor 660 may create the following filter:

[States].[CountryID] in ?dt:Country_CountryID? and [States].[StateID] in ?dt:States_StateID?

This filter defines two prompts that are cascaded automatically. This can be deduced since the filter references items from the same query subject. This filter may allow more rows than expected to appear in the result set. The target drill-through metadata manager 140 allows the modeler to override the default construction.

When multiple target filters define the same parameter (as determined by the name), the metadata service 26 considers those target filters that define the same parameter. The metadata service 26 derives the parameter from the filter that would produce the most restricted dataset. The metadata service 26 determines the target filter to use based on the target context metadata 302, e.g., information of join relationships between items. In the example described above, if both query subjects are used in the report, the metadata service 26 uses the target filter associated with States since States exist within Countries, as determined by the join cardinalities of the relationship between the two subjects. The metadata service 26 also ensures that items in the same position (i.e. [Countries].[CountryID] and [States].[CountryID]) are semantically equivalent. This can usually be deduced from the join expression.

Figure 7:
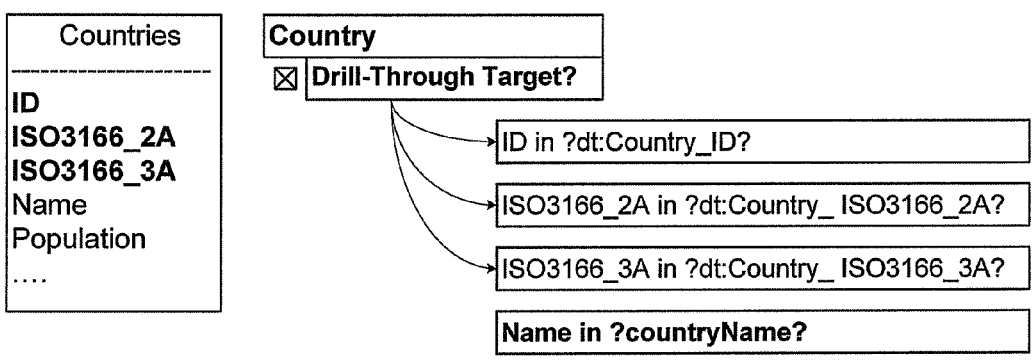
FIG. 7 is a diagram showing an example of target filters.

Example of the operation of the target drill-through metadata manager 140 is described. In the example shown in FIG. 7, a query subject "Country" in a relational source has items: ID, ISO3166-2A, ISO3166-3A, Name and Population, in which ID, ISO3166-2A, ISO3166-3A are keys. For this subject, if there is no custom filter stored, the metadata service 26 generates the following three default filters based on the keys and returns them to the specification processor 660:

(Default Filters)
 ID in ?dt:Country_ID?
 ISO3166_2A in ?dt:Country_ISO3166_2A?
 ISO3166_3A in ?dt:Country_ISO3166_3A?

If the following custom filter is stored, the metadata service 26 extracts the custom filter from the metadata 310, rather than generating the default filters, and returns the extracted custom filter to the specification processor 660:

(Custom Filter)
 Name in ?countryName?

This custom filter is constructed by the modeler. Although this is not a key column, it is still a convenient column for filtering purposes.

If the modeler wants to allow filtering using either a key or the custom filter, the modeler defines all four filters manually, thereby so that overriding the default behaviour.

In accordance with another embodiment of the invention, the notion of a target filter can also be extended to support drill-through based on a search paradigm. In this case, non-identifier items are used to filter data. One key aspect of search when compared to drill-through is that filters applied as a result of search should be combined using OR, while standard target filters should be combined using AND.

A consumer may provide the following parameter values when running a report: Colour: Blue; and Line: Camping Equipment. If these values are used with a search, the filter can be expressed as:

Product.Colour='Blue' or Product.Line='Camping Equipment' (1)

If these values are used with a standard drill-through, the filter can be expressed as:

Product.Colour='Blue' and Product.Line='Camping Equipment' (2)

The filter (1) is likely to return more data than the filter (2). This is appropriate given the search paradigm. The filters built for searching are based on metadata defined in the model, but the search filters are constructed in a way that allows more data to be selected. A drill-through operation is "more explicit" about the data that should be selected in the target, i.e., the target data set is typically a subset of the source data set, in terms of the common data items; whereas a search operation typically reverses the relationship between target and source data set, i.e., it searches any drill-through target that matches on any of these values.

Figure 8:
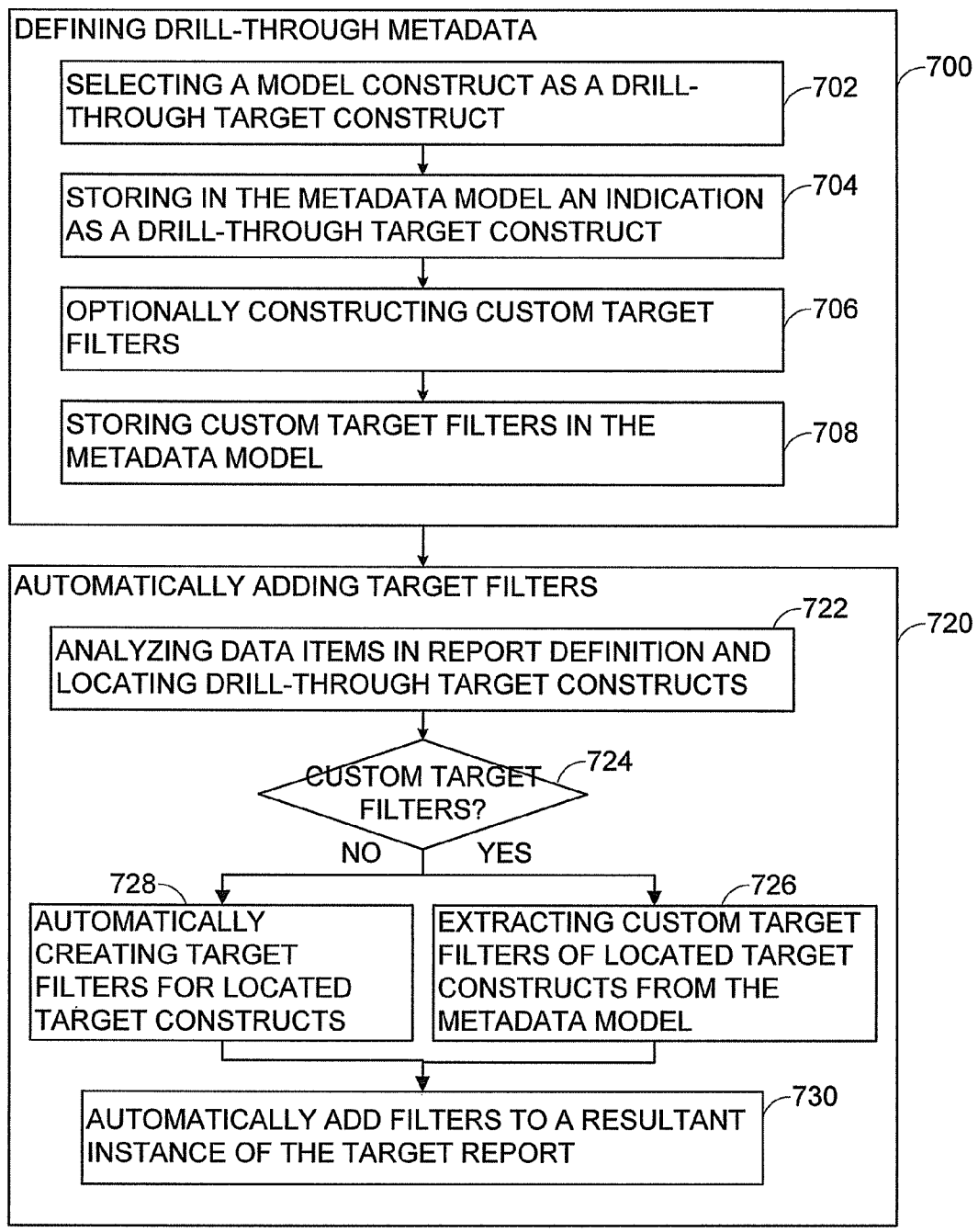
FIG. 8 is a flowchart showing an embodiment of a method of managing drill-through targets.

FIG. 8 shows a method of managing drill-through targets in accordance with an embodiment of the invention. The method defines drill-through metadata (700) by selecting a model construct as a drill-through target construct (702), and storing in the metadata model an indication that the selected construct is a drill-through target construct (704). Also, the modeler can optionally construct one or more custom target filters for the selected model construct (706) and stores the custom target filters in the metadata model in association with the selected model construct (708). Steps 702-708 are repeated for each selected model construct.

When a drill-through operation is carried out, one or more target filters are added to a target report (720) by locating one or more references to model constructs in a report definition that are identified as drill-through target constructs using the target metadata model (722), checking in the target metadata model if each located model construct has any custom target filters (724). If there are one or more custom target filters, the custom target filters are used (726). If there is no custom target filter stored for the located item, one or more default target filters are automatically created for the located model construct (728). The custom target filters and/or created target filters are added to the target report (730).

The target drill-through metadata manager of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the target drill-through metadata manager are described separately, however, two or more elements may be provided as a single element, or one or more elements may be shared with other components in one or more computer systems.

What is claimed is:

1. A target drill-through metadata manager comprising:
    a computer; and
    a computer memory storing instructions, wherein the instructions, when executed by the computer, cause the computer to:
    define and manage, by a target drill-through metadata handler, target drill-through metadata in a metadata model for one or more model constructs that are drill-through target constructs, wherein the target drill-through metadata handler allows a modeler to select a model construct and indicate the selected model construct as a drill-through target construct, the selected model construct being a query item, query subject, dimension, or hierarchy or level of the metadata model, wherein the drill-through metadata handler sets a flag indicating that its associated model construct is a drill-through target; and
    process, by a target specification processor, a target report definition using the target drill-through metadata to locate a data item that refers to a drill-through target construct or part of the drill-through target construct, and automatically add one or more target filters associated with the drill-through target construct to a target report,
    wherein the target drill-through metadata handler comprises a target filter constructer allowing a user to construct one or more custom target filters and store the one or more custom target filters in the metadata model in association with each associated selected model construct;
    wherein the target specification processor obtains the target filter from a metadata service which determines if there are one or more custom target filters stored in the metadata model for the drill-through target construct associated with the data item and, if one or more custom target filters are found, provides the one or more custom target filters to the target specification processor, and
    wherein the target specification processor automatically adds the one or more custom target filters to the target report.

2. The target drill-through metadata manager as recited in claim 1, wherein:
    the target specification processor obtains the one or more target filters from a metadata service which automatically generates the one or more target filters for the drill-through target construct.

3. The target drill-through metadata manager as recited in claim 1, wherein:
    the target specification processor has a default filter generator automatically generating the one or more target filters for the drill-through target construct.

4. The target drill-through metadata manager as recited in claim 1, wherein:
    the target specification processor obtains one or more default target filters generated by a metadata service when there is no stored custom target filter found for the drill-through target construct associated with the data item, and
    the target specification processor automatically adds the one or more default target filters generated by the metadata service to the target report.

5. The target drill-through metadata manager as recited in claim 4, wherein the target specification processor obtains one or more default target filters that filter values using a key in a relational database table in a source database.

6. The target drill-through metadata manager as recited in claim 4, wherein the target specification processor obtains one or more default target filters that are generated using a Member Unique Name (MUN) for one or more multidimensional stores.

7. The target drill-through metadata manager as recited in claim 4, wherein the target specification processor obtains one or more default target filters that are date or time filters that use one or more ranges.

8. The target drill-through metadata manager as recited in claim 4, wherein the target specification processor obtains one or more default target filters that are compound key filters for one or more relational systems.

9. The target drill-through metadata manager as recited in claim 1, wherein:
the target specification processor has a default filter generator generating one or more default target filters when there is no stored custom target filter found for the drill-through target construct associated with the data item, and
the target specification processor automatically adds the one or more default target filters generated by the default filter generator to the target report.

10. The target drill-through metadata manager as recited in claim 9, wherein the default filter generator generates one or more default target filters that filter values using a key in a relational database table in a source database.

11. The target drill-through metadata manager as recited in claim 1, wherein the target specification processor uses a report service to automatically add the one or more target filters to the target report.

12. A report system comprising:
a computer; and
a computer memory storing instructions, wherein the instructions, when executed by the computer, cause the computer to:
define and manage, by a target drill-through metadata handler, target drill-through metadata in a metadata model for one or more model constructs that are drill-through target constructs;
process, by a target specification processor, a target report definition using the target drill-through metadata to locate a data item that refers to a drill-through target construct or part of the drill-through target construct, and automatically add one or more target filters associated with the drill-through target construct to a target report; and
provide, by a metadata service, the one or more target filters to the target specification processor based on the target drill-through metadata,
wherein:
the target drill-through metadata handler comprises a target filter constructer allowing a user to construct one or more custom target filters and store the one or more custom target filters in the metadata model in association with each associated selected model construct;
the metadata service determines if there is any custom target filter stored in the metadata model for the drill-through target construct associated with the data item and, if one or more custom target filters are found, provides the one or more custom target filters to the target specification processor, and the target specification processor automatically adds the one or more custom target filters to the target report; and
the metadata service automatically generates one or more default target filters when there is no stored custom target filter found for the drill-through target construct associated with the data item, and
the target specification processor automatically adds the one or more default target filters generated by the metadata service to the target report.

13. A method of managing drill-through targets, the method comprising:
defining, in a metadata model, target drill-through metadata for one or more model constructs that are selected as drill-through target constructs;
processing a target report definition using the target drill-through metadata to locate a data item that refers to a drill-through construct or part of the drill-through target construct; and
automatically adding one or more target filters associated with the drill-through target construct to a target report,
wherein defining target drill-through metadata comprises:
allowing a user to construct one or more custom target filters; and
storing the one or more custom target filters in the metadata model in association with each associated selected model construct;
wherein processing the target report definition comprises:
determining if there is any custom target filters stored in the metadata model for the drill-through target construct associated with the data item; and
if one or more custom target filters are found, extracting the one or more custom target filters;
wherein automatically adding the one or more target filters comprises automatically adding the one or more custom target filters to the target report;
wherein processing the target report definition comprises generating one or more default target filters when there are no stored custom target filters found for the drill-through target construct associated with the data item; and
wherein automatically adding the one or more target filters comprises automatically adding the one or more default target filters to the target report.

14. The method as recited in claim 13, wherein defining target drill-through metadata comprises:
allowing a modeler to select a model construct as a drill-through target construct, the selected model construct being a query item, query subject, dimension, or hierarchy or level of the metadata model, and setting a flag of the selected model construct to indicate as a drill-through target construct.

15. The method as recited in claim 13, wherein
processing the target report definition comprises generating one or more default target filters for the drill-through target construct; and
automatically adding the one or more target filters comprises automatically adding the one or more default target filters to the target report.

16. The method as recited in claim 13, wherein generating the one or more default target filters comprises generating for the drill-through target construct one or more default target filters that filter values using a key in a relational database table in a source database.

17. The method as recited in claim 13, wherein generating the one or more default target filters comprises generating for the drill-through target construct one or more default target filters using a Member Unique Name (MUN) for one or more multidimensional stores.

18. The method as recited in claim 13, wherein generating the one or more default target filters comprises generating for the drill-through target construct one or more default target filters that are date or time filters that use ranges.

19. The method as recited in claim 13, wherein generating the one or more default target filters comprises generating for the drill-through target construct one or more default target filters that are compound key filters for one or more relational systems.

20. A computer readable medium storing instructions or statements for use in the execution in a computer of a method of managing drill-through targets, the method comprising the steps of:

defining, in a metadata model, target drill-through metadata for one or more model constructs that are selected as drill-through target constructs, wherein defining target drill-through metadata comprises allowing a modeler to select a model construct as a drill-through target construct, the selected model construct being a query item, query subject, dimension, or hierarchy or level of the metadata model, and setting a flag of the selected model construct to indicate as a drill-through target construct;

processing a target report definition using the target drill-through metadata to locate a data item that refers to a drill-through target construct or part of the drill-through target construct; and automatically adding one or more target filters associated with the drill-through target construct to a target report, wherein defining target drill-through metadata comprises:

allowing a user to construct one or more custom target filters; and storing the one or more custom target filters in the metadata model in association with each associated selected model construct;

wherein processing the target report definition comprises:

determining if there is any custom target filters stored in the metadata model for the drill-through target construct associated with the data item; and if one or more custom target filters are found, extracting the one or more custom target filters; and wherein automatically adding the one or more target filters comprises automatically adding the one or more custom target filters to the target report.

21. The computer readable medium as recited in claim 20, further comprising:

obtaining the one or more target filters from a metadata service which automatically generates the one or more target filters for the drill-through target construct.

22. The computer readable medium as recited in claim 20, wherein processing the target report definition comprises generating one or more default target filters for the drill-through target construct; and automatically adding the one or more target filters comprises automatically adding the one or more default target filters to the target report.

23. The computer readable medium as recited in claim 20, wherein processing the target report definition comprises generating one or more default target filters when there are no stored custom target filters found for the drill-through target construct associated with the data item; and automatically adding the one or more target filters comprises automatically adding the one or more default target filters to the target report.

24. The computer readable medium as recited in claim 20, wherein processing the target report definition comprises generating one or more default target filters when there is no stored custom target filter found for the drill-through target construct associated with the data item, and automatically adding the one or more target filters comprises adding the one or more default target filters generated by the default filter generator to the target report.

* * * * *